UNITED STATES PATENT OFFICE.

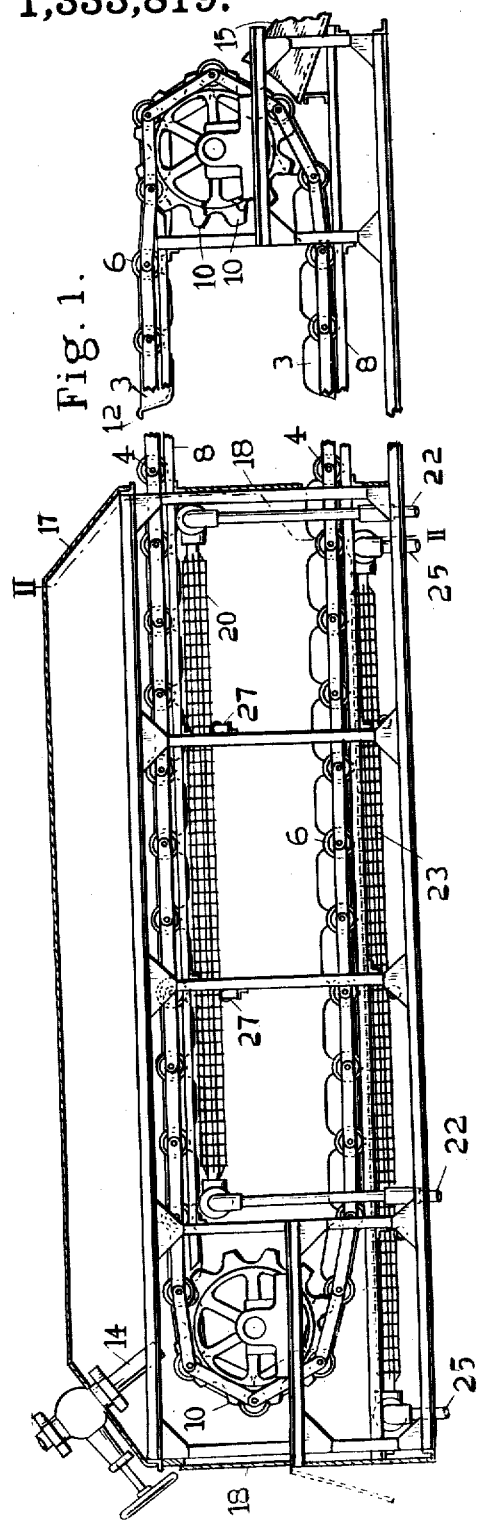

GUSTAV JEBSEN, OF CHRISTIANIA, NORWAY, ASSIGNOR, BY MESNE ASSIGNMENTS, TO TITAN CO. A/S., OF CHRISTIANIA, NORWAY.

PROCESS OF EXTRACTING TITANIUM COMPOUNDS FROM TITANIFEROUS MATERIAL AND THE PRODUCT OBTAINED THEREBY.

1,333,819.　　　　Specification of Letters Patent.　　Patented Mar. 16, 1920.

Application filed October 12, 1917. Serial No. 196,977.

*To all whom it may concern:*

Be it known that I, GUSTAV JEBSEN, a subject of Norway, and a resident of Christiania, Kingdom of Norway, have invented certain new and useful Improvements in Processes of Extracting Titanium Compounds from Titaniferous Material and the Product Obtained Thereby, of which the following is a specification.

This invention relates to a process for the recovery from titaniferous materials, such as ilmenite, of titanium in the form of hydrates and as a precipitate. The process broadly contemplates the decomposing of the titaniferous material, lixiviating the resultant product and precipitating the hydrates from the solution thus obtained. In case a titaniferous material containing iron is made use of and the precipitate is desired to be comparatively free from iron, the process contemplates avoidance of the undesired iron in any suitable manner, all as hereinafter set forth in detail.

I have discovered that when my process is employed a less quantity of decomposing agent may be used than would be required to form normal salts with the base-forming material present in the solution obtained by the lixiviation.

In carrying out the decomposition stage of the process I have evolved a novel method by the use of apparatus found to be particularly advantageous for this purpose, and the same is presented herewith as the preferred method of conducting this operation.

Furthermore the solution which is formed in the carrying out of my process is novel in itself and possesses certain advantageous qualities not heretofore known or understood.

In the precipitation stage of the process I prefer to follow the method which is the discovery of Morten Fladmark and which is embodied in United States Letters Patent No. 1,288,863 granted December 24th, 1918, and while in order that my complete process may be understood that method of precipitation is herein described, no specific claims are presented directed solely to this feature. By way of introduction on this point I may say that precipitation of the hydrates may be effected from my solution, which is preferably very concentrated, by the application of heat and without dilution.

The treatment of ilmenite and other materials containing iron and titanium for the purpose of obtaining titanium hydrates has hitherto been carried out in various manners and various processes have been proposed for this purpose. According to known methods the materials have been decomposed or rendered soluble by fusion with potassium or sodium carbonates, bisulfates or other known dissolving agents. The decomposition or dissolution has also been effected by means of acids such as sulfuric acid, hydrochloric acid, etc. According to these known methods the dissolution has been effected by the use of such a large quantity of the dissolving agent that a practically complete dissolution of the titaniferous material in question has been obtained in one single operation. To obtain this an excess of dissolving or decomposing agent has been employed and this excess quantity then represents a direct loss of dissolving agent or increased expenses in connection with the recovery of such excess quantity.

When these well known processes are employed, and a solution of titanium compounds is subsequently obtained by dissolving the decomposition product in water, it has been found that the excess of decomposition agent present, even though slight, will prevent an economical precipitation of the hydrates by heating unless the solution is first diluted. The dilution of this solution results in inconvenience and expense in handling and precipitating therefrom. Furthermore, when a comparatively large amount of water is added to the decomposition product, unless there is an excess of decomposition agent present, the titanium compounds first dissolved undergo partial hydrolysis, and this hydrolysis increases with the amount of water employed.

In addition to the above, when a dilute solution is employed the filtrate resulting after the precipitation of the hydrate will be of such low concentration that the recovery of the unhydrolyzed salts of the metals present in the original material and of the decomposing agent liberated by the hydrolysis can be effected only at large expense.

Now, according to the present invention, practically complete decomposition of the titaniferous material may be effected by the use of a considerably smaller quantity of decomposing agent than has heretofore been considered as theoretically possible: and, as stated above, a highly concentrated solution may be prepared from the resultant decomposition product from which without dilution a satisfactory yield of comparatively pure titanium hydrates can be precipitated.

As ilmenite is the most available titaniferous material found in nature, that ore will be used in the following illustration of the manner in which the process is carried out, sulfuric acid will be spoken of as the decomposition agent, and the apparatus herein shown will be employed in the decomposition step of the process: but it is to be understood that the choosing of ilmenite and the sulfuric acid, and the employment of the said apparatus are for the purpose of illustration only and are not to be taken as limitations on the invention.

In these drawings Figure 1 is a side elevation of an endless conveyer supplied with an oven for a portion of its length, the side walls of the oven not being illustrated, and the roof and ends of the oven being in vertical section; and Fig. 2 is a cross-section on the line II II of Fig. 1 with the side walls of the oven added but with the carrier or propeller wheel omitted, the omission of the aforesaid parts in the two figures being for clearness of illustration.

Taking up now the specific example chosen for illustrative purposes, the ilmenite first having been reduced to convenient form for decomposition, for instance, first having been pulverized, is placed in a suitable mixer and thoroughly mixed with the desired quantity of sulfuric acid. I have found that sulfuric acid containing 94 per cent. $H_2SO_4$ in the proportion by weight of one to one will give favorable results. When the ilmenite composition is then allowed to take place and sulfuric acid have been thoroughly mixed, they take the form of a slime. De- and if desired may be accelerated by the application of heat. To accomplish this result I have found, however, that continued application of the heat is not necessary for when the temperature of the mixture is raised to 100° C. or thereabout, the desired decomposition will take place with speed and violence. When the reaction is completed the mass will have formed into a more or less solid cake.

The apparatus herein illustrated forms a convenient means for carrying on this decomposition.

The apparatus comprises an endless conveyer composed of a series of buckets 3, 3 attached to and carried by the links 4, 4 of the conveyer. The adjacent pairs of links are joined at their respective ends by means of cross-rods 5, 5 upon which are rotatably mounted pairs of flanged traction wheels 6, 6 which latter run on pairs of rails 8, 8 suitably mounted along the upper and lower travel of the conveyer to support the same. At both ends of the conveyer are located pairs of suitably mounted sprocket wheels 10, 10 which serve to drive and support the conveyer in the usual manner. This type of conveyer is well known in the conveyer art and no specific driving means are illustrated.

Each of the buckets is provided with a transverse lip, illustrated at 12, at one of its ends, which overlaps the end wall of the adjacent bucket so that a continuous stream of the aforesaid slime may be supplied to the buckets without loss between them. The means of supplying the slime are indicated by the valved inlet pipe 14 mounted at one end of the conveyer in a position to discharge into the buckets thereof. A discharge-hopper 15 is mounted at the other end of the conveyer, into which the decomposed contents of each bucket will fall by gravity as the buckets are turned over in traveling around the sprocket wheels adjacent thereto. The hopper is intended to discharge the decomposed mass into the apparatus to be next employed as will readily be understood.

As here illustrated, the charging end of the conveyer is located in an oven 17, access to which may be had through the doors 18, 18. A series of steampipes 20, 20 equipped with radiating fins and supplied with steam from steampipe 22 is located beneath the upper tier of buckets and serves to supply heat to the contents thereof. A similar series of radiating steampipes 23, 23 supplied with steam from steampipe 25 may be located beneath the overturned buckets on their lower travel for the purpose of drying and preliminarily heating them. Each series of radiating steampipes is illustrated as being supported on rollers 27, 27 to allow for expansion and contraction of the pipes.

In the arrangement illustrated the supply of slime will be so regulated that each bucket is properly filled; and the rate of travel and length of conveyer will be such that the desired decomposition will have taken place just prior to the dumping of the bucket contents, then a more or less solid cake, into the hopper 15.

The solution from which the hydrates are to be precipitated is made from this cake, and to this end, the cake is first crushed by the employment of any suitable crusher. With this in view the size and shape of the buckets 3 3 should be such that the cakes formed therein may be fed from the hopper 15 directly to the crusher. The mass having been crushed is then lixiviated preferably with a series of vessels according to the counter-current principle, cold water being employed in such quantity that crystallization is just avoided in the last vessel of the series. As the counter-current method of lixiviation is well known in other arts a complete description thereof is here omitted, attention being called to the fact that by its employment, the decomposition product is lixiviated with a solution of the said product itself.

The result of this lixiviation is to form a concentrated solution of the soluble substances in the decomposition product, which solution contains less sulfuric acid than would be required to form normal salts with the base-forming material present therein.

In the last vessel of the series will also be found a residue which may be called residue No. 1. In carrying out the decomposition by steps this residue is treated in the same manner as the original ilmenite and the process repeated up to and including the lixiviation. Thereby a second solution is formed, of a like character as the first solution, and a residue No. 2. This residue may be given the same treatment as residue No. 1 and a third solution and a residue No. 3 obtained. In most instances this latter residue will consist principally of silicic acid compounds of the ore. In cases where residue No. 3 still contains some undissolved titanium, the above operation may be repeated and so on step by step until the titanium is entirely dissolved.

It is not necessary for the successful carrying out of my process to attain a complete decomposition of the ilmenite, the point at which it is desirable to carry the decomposition being largely determined by economic reasons and comparative costs. Thus if desired the decomposition may be terminated at the end of the first, second or third, etc., steps.

As an example of the efficiency of this portion of my process when carried on by steps, the following data and calculations are presented. Experiments were carried on with ilmenite containing the following materials which could be rendered soluble by treatment with sulfuric acid:

$TiO_2$ ---------------------- 38.8%
$Fe_2O_3$ --------------------- 12.6%
$CaO$ ----------------------- 1.8%
$FeO$ ----------------------- 26.6%
$Al_2O_3$ --------------------- 4.7%
$MgO$ ----------------------- 5.5%

In order to completely decompose this ilmenite and transform these substances into normal sulfates one part by weight of the ilmenite would require 1.9 parts by weight of $H_2SO_4$. When this ilmenite was treated in three steps as above outlined a complete decomposition was effected by the use of 1.44 parts by weight of $H_2SO_4$ to one part by weight of the ilmenite.

The solution or solutions, if more than one, obtained as above may be treated separately or may be mixed and treated as a whole. It is at this stage of the process where the desired purity of the product must be taken into consideration. If a titanium hydrate practically free from iron is sought, this result may be obtained by reducing the iron present in the solution from a ferric to a ferrous condition. This reduction is preferably carried on at this point and may be accomplished in any well known and suitable manner. The desired purity of product may also be attained without reduction of the iron by a subsequent treatment of the precipitate, later to be described.

It is immaterial so far as the precipitation is concerned whether the solution to be submitted to precipitation is one in which the iron has been reduced, or the one obtained directly by lixiviation. The solution in either case may now be submitted to precipitation by means of any well known suitable method. I prefer, however, to effect precipitation by the application of heat, without diluting the solution. To this end the solution is placed in a lead-lined container equipped with coils of lead pipe. Heat is applied by passing steam through the coils, and precipitation takes place. It has been found that the precipitation may be satisfactorily brought about by heating the solution to approximately 80° C., and continuing the application of heat for several hours. Where it is desired to increase the rapidity of precipitation, the temperature of the solution may be raised even above the boiling point by the employment of suitable apparatus for this purpose.

Considering that the above process has been carried on without the reduction of the iron, the precipitate thrown down for many purposes may be considered the final product herein sought. It is rich in titanium hydrates and contains less iron than the precipitates which have been obtained in accordance with previous processes from dilute solutions and without the iron reduction.

However, for some purposes, particularly for use in the formation of certain pigments where the presence of small quantities of iron is objectionable, the process should include the reduction of the iron as above outlined or the precipitate should be treated to eliminate the objectionable iron. A suitable treatment of the precipitate for this purpose is to subject it to the entire process above outlined, starting the process with the precipitate instead of with ilmenite and omitting the reduction of the iron. The titanium hydrate thus re-precipitated will be found to be comparatively free from iron and suitable for use in the formation of pigments.

The undecomposed salts and the decomposing agent liberated by the hydrolysis of the titanium compounds obviously can, on account of their comparatively high concentration, be recovered from the filtrate much more readily than in the case of the previous processes in which precipitation was brought about from a dilute solution.

The word "hydrates" as used herein is employed as a general term and includes hydrated oxides with or without more or less basic salts or adsorbed acids.

The foregoing detailed description has been given for clearness of understanding and no undue limitation should be deduced therefrom, but the appended claims should be construed as broadly as permissible in view of the prior art.

What I claim as new and desire to secure by Letters Patent of the United States is:

1. The process of effecting the decomposition of titaniferous materials, which comprises treating the material with a decomposing agent and subjecting the resultant batch to heat by means of an endless conveyer, the buckets of which are passed through a heated area, whereby the decomposed material is formed into a comparatively solid mass.

2. The process of effecting the decomposition of titaniferous material, which comprises treating the material with sulfuric acid and subjecting the resultant batch to initial heat by means of an endless conveyer, the buckets of which are passed through a heated area, whereby the decomposed material is formed into a comparatively solid mass.

3. The process of preparing from titaniferous materials a solution containing a titanium compound, which comprises subjecting the material to decomposition by treating the material with a decomposing agent and lixiviating the resultant product, the quantity of decomposing agent employed being less than would be required to form normal salts with the base-forming materials present in the resultant solution.

4. The process of preparing from titaniferous materials containing iron a solution principally of titanium and iron compounds, which comprises subjecting the material to decomposition, by treating the material with a decomposing agent and lixiviating the resultant product, the quantity of decomposing agent employed being less than is required to form normal salts with the base-forming material present in the resultant solution.

5. The process of preparing from titaniferous materials containing iron a solution principally of titanium and iron compounds, which comprises subjecting the material to decomposition, by treating the material with sulfuric acid and lixiviating the resultant product, the quantity of sulfuric acid employed being less than is required to form normal salts with the base-forming material present in the resultant solution.

6. The process of preparing from titaniferous materials containing iron a solution principally of titanium and iron compounds, which comprises subjecting the material to decomposition by treating the material with sulfuric acid in the proportion by weight of one part sulfuric acid to one part of the material, and lixiviating the resultant product.

7. The process of preparing from titaniferous materials containing iron a solution principally of titanium and iron compounds, which comprises subjecting the material to decomposition, by treating the material with sulfuric acid, subjecting the material thus treated to an initial heat, and lixiviating the material after heating, the quantity of sulfuric acid employed being less than is required to form normal salts with the base-forming material present in the resultant solution.

8. The process of preparing from titaniferous materials containing titanium and iron in solid form a solution of titanium and iron compounds, which comprises subjecting the material to decomposition by treating the material with sulfuric acid to form a slime, subjecting the slime to heat and thereby reducing the slime to a solid mass, and lixiviating the said mass, the quantity of sulfuric acid employed being less than is required to form normal salts with the base-forming material present in the resultant solution.

9. The process of preparing from titaniferous materials a solution containing a titanium compound, which comprises subjecting the material to decomposition by treating the material with a decomposing agent lixiviating the decomposition product with water to form a solution containing a titanium compound, and treating fresh decomposition product with the solution thus formed.

10. The process of preparing from titaniferous materials a concentrated solution containing a titanium compound, which comprises subjecting the material to decomposition by treating the material with a decomposing agent, and lixiviating the resultant product with a solution containing a titanium compound obtained by treating the decomposition product with water, said lixiviation being carried out according to the counter-current principle and being continued until a concentrated solution is obtained.

11. The process of preparing from titaniferous materials containing iron a solution principally of titanium and iron compounds, which comprises subjecting the material to decomposition by treating the material with a decomposing agent, lixiviating the decomposition product with water to form a solution containing combined titanium and combined iron, and lixiviating fresh decomposition product with the solution thus formed.

12. The process of preparing from titaniferous materials containing iron a concentrated solution pricipally of titanium and iron compounds, which comprises subjecting the material to decomposition by treating the material with a decomposing agent, and lixiviating the resultant product with a solution containing compounds of titanium and iron obtained by treating the decomposition product with water, said lixiviation being carried out according to the counter-current principle and being continued until a concentrated solution is obtained.

13. The process of preparing from titaniferous materials containing iron a concentrated solution principally of titanium and iron sulfates, which comprises subjecting the material to decomposition by treating the material with sulfuric acid, and lixiviating the resultant product with a solution containing sulfates of iron and titanium obtained by treating the decomposition product with water, said lixiviation being carried out according to the counter-current principle and being continued until a concentrated solution is obtained, which solution contains substantially no more of the $SO_4$ radical than would be required to combine with the base-forming material present to form normal salts.

14. The process of preparing from titaniferous materials containing iron a solution principally of titanium and iron sulfates, which comprises subjecting the material to decomposition by treating the material with sulfuric acid and subjecting the resultant product to lixiviation with a solution containing sulfates of iron and titanium obtained by treating the decomposition product with water, the said lixiviation being carried out according to the counter-current principle and the amount of water employed being such that a saturated solution is obtained.

15. The process of preparing from titaniferous materials a titanium hydrate, which comprises subjecting the material to decomposition by treating the material with a decomposing agent, lixiviating the resultant product and precipitating the hydrates from the solution thus obtained by the application of heat, the quantity of decomposing agent employed being less than is required to form normal salts with the base-forming material present in the solution.

16. The process of preparing from titaniferous materials containing iron a titanium hydrate comparatively free from iron compounds, which comprises subjecting the material to decomposition by treating the material with a decomposing agent, lixiviating the resultant product according to the counter-current principle with water in sufficient quantity to form a concentrated solution, and effecting precipitation of the said hydrate from the solution thus obtained by the application of heat.

17. The process of preparing from titaniferous materials containing iron a titanium hydrate, which comprises subjecting the material to decomposition by treating the material with a decomposing agent, lixiviating the resultant product, effecting precipitation in the solution thus obtained, subjecting the precipitate to the action of the decomposing agent, lixiviating the resultant product, and precipitating the hydrate from the solution thus obtained.

18. The process of preparing from titaniferous materials containing iron a titanium hydrate, which comprises subjecting the material to decomposition by steps, by treating the material with a decomposing agent, lixiviating the resultant product, reducing the ferric iron present in the solution to the ferrous condition, and precipitating the hydrate from the solution.

19. The process of preparing from titaniferous materials containing iron a titanium hydrate, which comprises subjecting the material to decomposition by treating the material with a decomposing agent, lixiviating the resultant product, reducing the ferric iron present in the solution to the ferrous condition, and precipitating the hydrate from the solution, the quantity of decomposing agent employed being less than is required to form normal salts with the base-forming material present in the solution.

20. As a new and useful article, a solution essentially of combined titanium and containing an acid radical, the solution being formed from decomposition product obtained by the treatment of titaniferous material with a decomposing agent containing an acid radical, the acid radical contained in the solution being in less quantity than would be present if all of the base-forming material in the solution were in the form of normal salts.

21. As a new and useful article, a solution essentially of combined titanium and containing the $SO_4$ radical, the solution being formed from decomposition product obtained by the treatment of titaniferous materials with sulfuric acid, the $SO_4$ radical contained in the solution being in less quantity than would be present if all of the base-forming material in the solution were in the form of normal sulfates.

22. As a new and useful article, a solution essentially of combined titanium and containing combined iron and the $SO_4$ radical, the solution being formed from decomposition product obtained by the treatment of titaniferous materials with sulfuric acid, the $SO_2$ radical contained in the solution being in less quantity than would be present if all of the base-forming material in the solution were in the form of normal sulfates.

Signed at Christiania, Norway, this 14th day of September, 1917.

G. JEBSEN.

Correction in Letters Patent No. 1,333,819.

It is hereby certified that in Letters Patent No. 1,333,819, granted March 16, 1920, upon the application of Gustav Jebsen, of Christiania, Norway, for an improvement in "Processes of Extracting Titanium Compounds from Titaniferous Material and the Product Obtained Thereby," an error appears in the printed specification requiring correction as follows: Page 6, line 14, claim 22, for "$SO_2$," read $SO_4$; and that the said Letters Patent should be read with this correction therein that the same may conform to the record of the case in the Patent Office.

Signed and sealed this 26th day of April, A. D., 1921

[SEAL.]

T. E. ROBERTSON,

*Commissioner of Patents.*

Cl. 134—58.